(12) United States Patent
Wang et al.

(10) Patent No.: US 11,346,432 B2
(45) Date of Patent: May 31, 2022

(54) ELECTRICALLY CONTROLLED AUTOMATIC LOCKER DIFFERENTIAL

(71) Applicant: EATON INTELLIGENT POWER LIMITED, Dublin (IE)

(72) Inventors: Hongbin Wang, Novi, MI (US); Andrew N. Edler, Homer, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/979,645

(22) PCT Filed: Mar. 5, 2019

(86) PCT No.: PCT/EP2019/055415
§ 371 (c)(1),
(2) Date: Sep. 10, 2020

(87) PCT Pub. No.: WO2019/170654
PCT Pub. Date: Sep. 12, 2019

(65) Prior Publication Data
US 2021/0364076 A1    Nov. 25, 2021

Related U.S. Application Data

(60) Provisional application No. 62/639,714, filed on Mar. 7, 2018.

(51) Int. Cl.
*F16H 48/34*   (2012.01)
*F16H 48/08*   (2006.01)
*F16H 48/24*   (2006.01)
*F16H 48/20*   (2012.01)

(52) U.S. Cl.
CPC ............. *F16H 48/34* (2013.01); *F16H 48/08* (2013.01); *F16H 48/24* (2013.01); *F16H 2048/204* (2013.01)

(58) Field of Classification Search
None
See application file for complete search history.

(56) References Cited

U.S. PATENT DOCUMENTS

| 3,818,781 | A * | 6/1974 | Goscenski, Jr. ........ F16H 48/24 475/231 |
| 6,319,166 | B1 | 11/2001 | Kyle et al. |
| 7,361,116 | B2 | 4/2008 | Kyle et al. |
| 7,438,661 | B2 * | 10/2008 | Kyle ...................... F16H 48/30 475/232 |
| 8,167,763 | B2 | 5/2012 | Curtis |

(Continued)

*Primary Examiner* — Leslie A Nicholson, III
(74) *Attorney, Agent, or Firm* — Dinsmore & Shohl LLP

(57) ABSTRACT

A electric locker differential assembly includes a first and second side gear. A pinion gear set is disposed between the first side gear and the second side gears. An engagement shaft includes flyweights disposed on the engagement shaft which are moveable between retracted and extended positions to lock and unlock the differential assembly. A lockout shaft includes a pawl disposed thereon. An electrical adjustment mechanism includes an actuator operably connected with an adjustment nut or rod. An electrical adjustment biasing spring includes a first leg retained by the adjustment nut and a second leg connected with the pawl wherein movement of the adjustment nut by the actuator varies a biasing force applied to the pawl.

18 Claims, 4 Drawing Sheets

(56) References Cited

U.S. PATENT DOCUMENTS 8,216,106 B2 * 7/2012 Curtis .................. F16H 48/22
 475/235
9,400,044 B2 7/2016 Wadhva et al.

* cited by examiner

ELECTRICALLY CONTROLLED AUTOMATIC LOCKER DIFFERENTIAL

FIELD OF THE INVENTION

The invention relates to differential control mechanisms for a motor vehicle and with more particularity to an locker differential with an electrically adjustable automatic locking mechanism.

BACKGROUND OF THE INVENTION

Generally in an open mode, an automatic locker differential is configured to allow two wheels on a motor vehicle to operate at different speeds. In a locked mode, the differential is locked so that the two wheels rotate at the same speed. Mechanical or automatic locker differentials are known and may include various mechanical structures to switch between the open and locked conditions of the differential. For example, the mechanical structure may include flyweights that are actuated by rotation such that the weights move against a biasing force in response to a centrifugal force due to the rotation. Typically such flyweights are structured to include a predetermined or designed condition at which they operate to open or lock the differential.

It would be desirable to have a automatic locker differential that may include a variable or adjustable locking and unlocking ability such that various conditions may be selected to perform the locking and unlocking of the differentia to accommodate various driving conditions and provide product intelligence.

SUMMARY OF THE INVENTION

In one aspect there is disclosed, a differential assembly that includes a first and second side gear. A pinion gear set is disposed between the first side gear and the second side gears. An engagement mechanism is configured to have at least a portion of the engagement mechanism moveable from a retracted position to an extended position to lock and unlock the differential assembly. An electrical adjustment mechanism is configured to engage and at least partially control movement of the engagement mechanism. The electrical adjustment mechanism includes an electric actuator operably connected to an adjustment biasing spring having a first leg retained by the adjustment mechanism and a second leg connected with the locking mechanism wherein a biasing force of the adjustment biasing spring is varied.

In another aspect, there is disclosed a differential assembly that includes a first and second side gear. A pinion gear set is disposed between the first side gear and the second side gears. An engagement shaft includes flyweights disposed on the engagement shaft which are moveable between retracted and extended positions to lock and unlock the differential assembly. A lockout shaft includes a pawl disposed thereon. An electrical adjustment mechanism includes an electric actuator operably connected with an adjustment nut. An adjustment biasing spring includes a first leg retained by the adjustment nut and a second leg connected with the pawl wherein movement of the adjustment nut by the actuator varies a biasing force applied to the pawl.

In a further aspect, there is disclosed a differential assembly that includes a first and second side gear. A pinion gear set is disposed between the first side gear and the second side gears. An engagement shaft includes flyweights disposed on the engagement shaft which are moveable between retracted and extended positions to lock and unlock the differential assembly. A lockout shaft includes a pawl disposed thereon. An adjustment mechanism includes an actuator operably connected with an adjustment nut. An adjustment biasing spring includes a first leg retained by the adjustment nut and a second leg connected with the pawl wherein movement of the adjustment nut by the electric actuator varies a preload applied to the pawl.

DETAILED DESCRIPTION OF THE PREFERRED EMBODIMENTS

Generally, for a vehicle, torque may be provided by an engine to a transmission to a power transfer unit to a drive shaft to a pinion gear to a ring gear around a differential case to a pinion shaft 20 within the differential. As the pinion shaft 20 rotates, meshed pinion gears 22 and 24 transfer differentiated or undifferentiated torque to side gears 26 and 28. The side gears 26, 28 may transfer torque to drive axles. Torque is then transferred to the wheels of the vehicle.

In an open or unlocked condition, a differential is configured to allow two wheels on a motor vehicle to operate at different speeds. In a locked condition, the two wheels are locked so that they rotate at the same speed. An automatic locking differential uses a mechanical device to actuate between the preset locked and open conditions.

Figure 1:
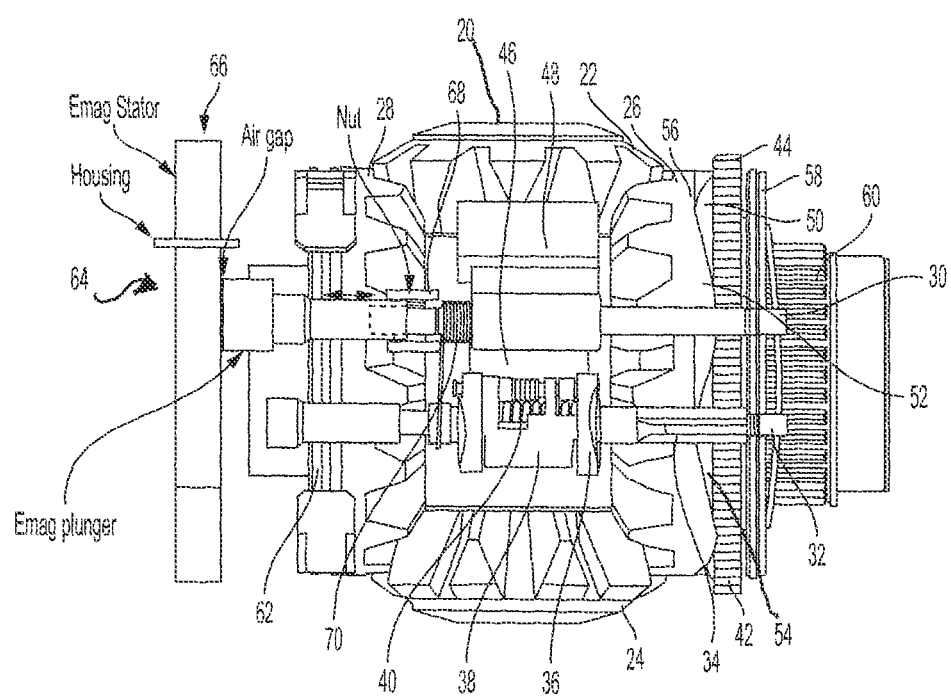
FIG. 1 is a partial sectional view of a differential including an electrical adjustment mechanism.

Referring to FIG. 1, the differential 10 includes a mechanical engagement mechanism including a lockout shaft 30 and an engagement shaft 32. Both of the shafts 30, 32 include opposing ends that are retained by the differential case.

The engagement shaft 32 may include a shaft gear 34. End plates 36 may have flyweights 38 between them and a flyweight spring 40 may bias the flyweights 38 to a retracted position. The engagement shaft 32 may rotate with a cam plate 42 by meshing of the shaft gear 34 with rim teeth 44 formed on the cam plate 42. When the engagement shaft 32 rotates due to a difference between the speeds of the two wheels, and once the difference of rotation speed is above a predetermined value, the flyweights 38 move outward to an extended position due to a centrifugal force that is greater than the biasing force of the flyweight spring 40.

In order to lock the differential at least one of the flyweights 38 must engage with a pawl 46 on the lockout shaft 30. The lockout shaft 30 also includes a counterweight 48 to pull the pawl 46 out of the available range of the flyweights 38 if the vehicle travels over a predetermined speed such that the differential cannot enter the locked condition.

In the open or unlocked condition the flyweights 38 are biased in a closed position. In the locked condition, the flyweights 38 have moved to engage the pawl 46. The engagement of the pawl 46 and the flyweights 38 blocks the engagement shaft 32 from rotation. As described above, the shaft gear 34 is geared to rim teeth 44 of the cam plate 42 which creates sufficient force to move the cam plate 42.

The cam plate 42 has ramps 50 separated by valleys 52. The ramps 50 slide against corresponding side gear ramps 54. When in the unlocked condition, ramps 50 rest in side gear valleys 56, and side gear ramps 54 rest in valleys 52. In the locked mode, the ramps 50 slide out of the valleys 56 and against opposed ramps 54 to lock the differential as will be described in more detail below.

The side gear 26 is braced against the pinion gears 22 and 24 and motion of the side gear 26 as the cam plate 42 "ramps-up" can be passed to lock plates 58. As the cam plate 42 "ramps-up," lock plate 58 moves axially along side gear 26 to engage outer splines 60. The lock plate 58 is coupled to rotate with the side gear 26. When the lock plate 58 is engaged, the side gear 26 is locked to rotate with the differential case. The pinion shaft 20 is locked to the differential case. The pinion gears 22 and 24 are locked to rotate with the side gear 26 via the meshing of side gear 26 with the pinion gears 22, 24. Therefore, the side gear 28 must rotate at the same rate as the side gear 26. In the depicted view, side gear 28 further includes an outer spline for coupling to clutch pack 62. The clutch pack 62 can be used to provide limited slip capability to the differential.

Figure 2:
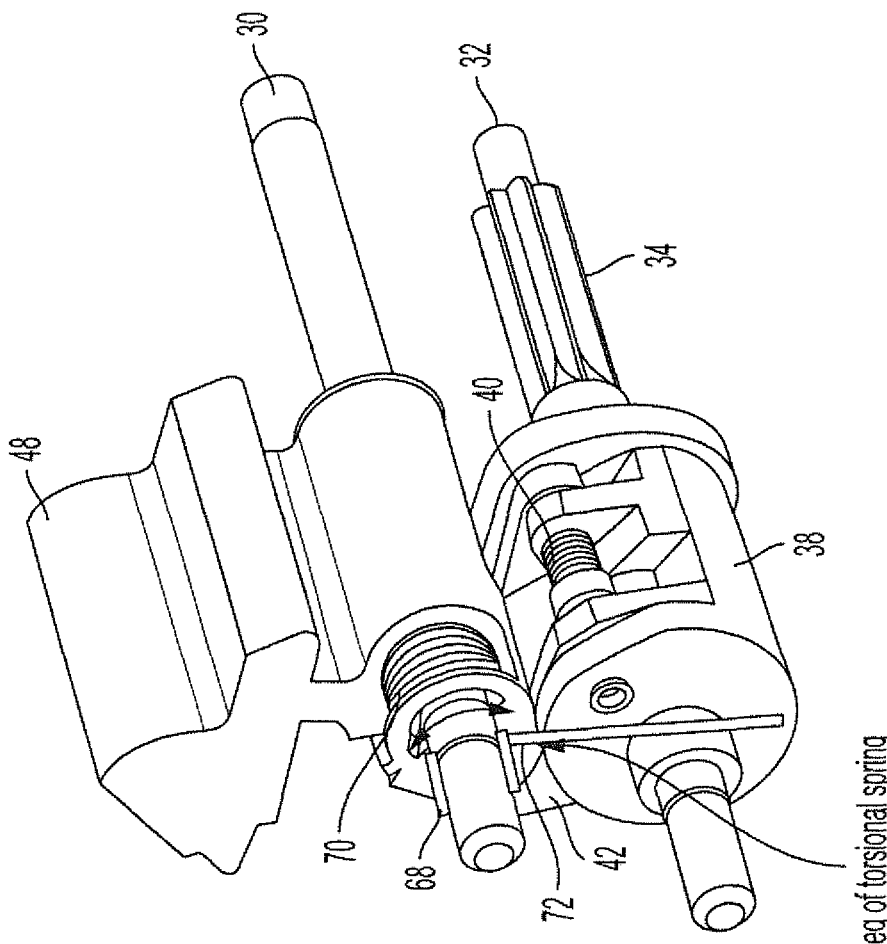
FIG. 2 is a perspective view of a lockout shaft and an engagement shaft.
Figure 3:
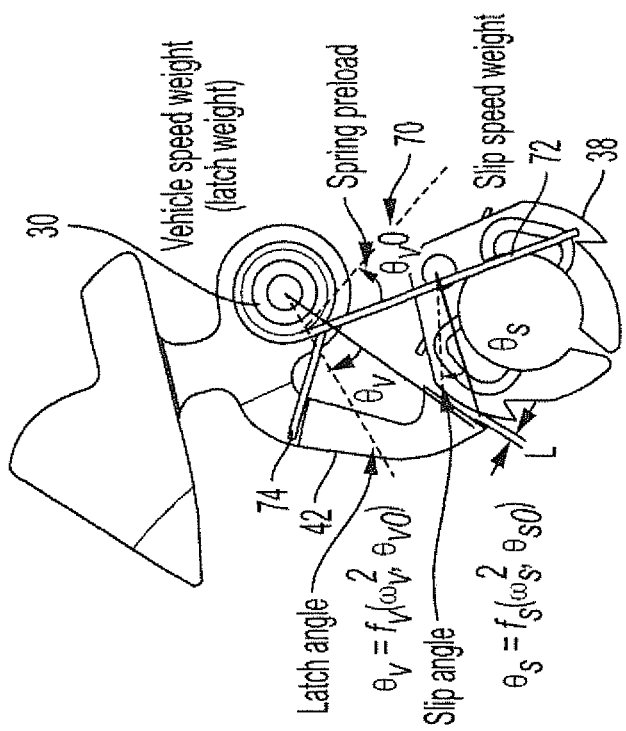
FIG. 3 is a vector diagram of the lockout shaft and engagement shaft detailing the pawl, flyweight and pawl biasing spring.

Referring to FIGS. 1-3, in one aspect, the position of the pawl 46 on the lockout shaft 30 may be adjusted relative to the engagement shaft 32 and subsequently relative to the flyweights 38. The position may be adjusted or varied by an electrical adjustment mechanism 64 which includes an electric actuator 66 operably connected with an adjustment nut 68. An adjustment biasing spring 70 includes a first leg 72 retained by the adjustment nut 68 and a second leg 74 connected with the pawl 46. In this manner the position of the adjustment nut 68 may alter the angular position of the leg 72 such that the biasing force applied to the pawl 46 is varied to adjust a position of the pawl 42 relative to the flyweights 38, This adjustment provides controllable locking at different slip speed for traction and also controllable unlocking at different vehicle speed for Various actuators 66 may be utilized to adjust a position of the leg 72, such as a linear electric solenoid or a rotational electric solenoid. In the depicted embodiment of FIG. 1, the actuator 66 may include an electric solenoid mechanism which provides linear motion that is translated to rotational motion by the adjustment nut 68. The adjustment nut 68 applies a variable preload to the pawl 46 due to the angular displacement of the adjustment biasing spring 70.

Referring to FIG. 3, there is shown a free body diagram displaying the variable position of the adjustment biasing spring 70 having legs 72 and 74. As shown in the figure, the balance of the spring load and the eccentric force on the pawl 46 determines the equilibrium angular position of the pawl 46 which engages the flyweights 38 to lock the differential. As shown in the figure, the locking condition is a function of the angular positions of the pawl 42 and flyweight 38 ($\theta_{VO}$ and $\theta_{SO}$) and the rotational unlocking vehicle speeds $\omega_V$ and locking wheel slip speed $\omega_S$.

In one aspect, the actuator 66 may be a three position solenoid having a neutral, forward and reverse position that is actuated by a DC current. The solenoid stator may be attached to the housing of the axle. The armature of the solenoid is movable along an axial direction of the differential, as shown in FIG. 1.

Figure 4:
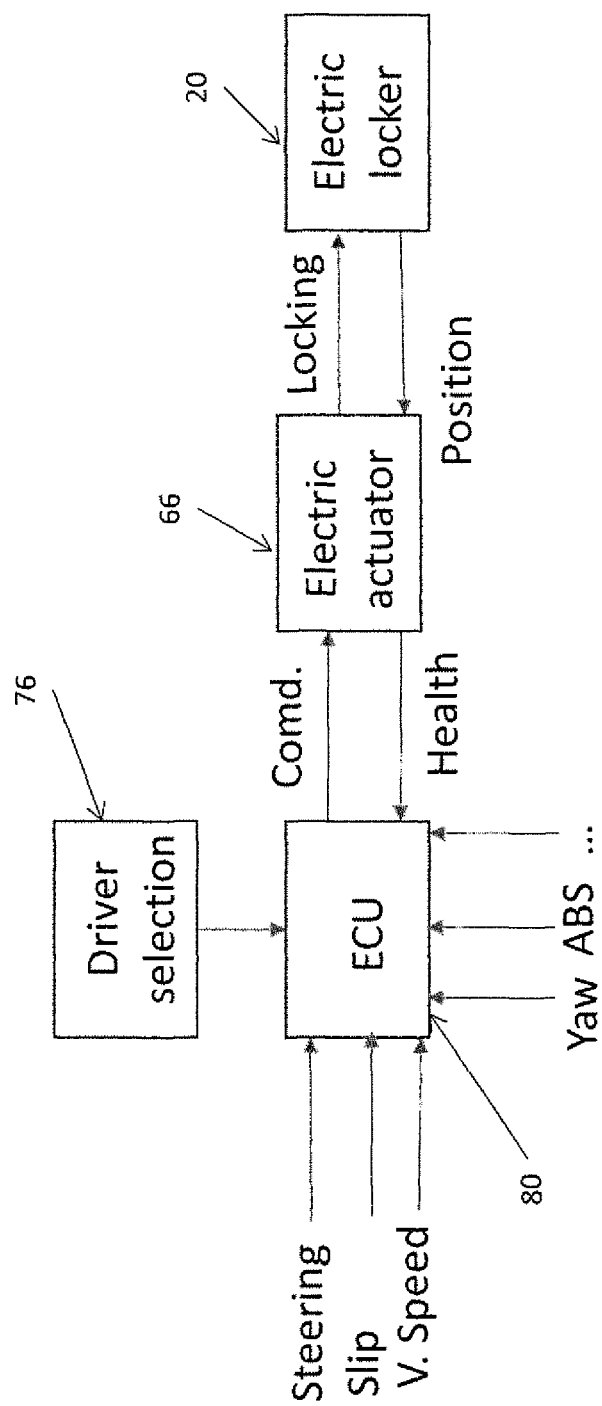
FIG. 4 is a diagram of an electrical control and communication system for the differential.

Referring to FIG. 4, control of the current to the actuator or solenoid 66 may be selected by various systems. In one aspect, the solenoid position may be selected by a selection interface or position switch or driver selection 76 on a vehicle dashboard, where the driver can easily access and activate the switch depending on road conditions and driver intention. The switch position will send a signal to the control unit or ECU 80 which may be separate or a part of the electric drive or actuator mechanism 66 to adjust a position of the adjustment biasing spring 70 varying an engagement position of the pawl 46. The control of the electric actuator can also be integrated into a vehicle control unit or ECU. The control unit or ECU 80 includes a computer processor, communication ports, memory, and programming. The control unit 80 may be a portion of an engine control unit (ECU). The ECU may include a control algorithm for torque management intelligence and system condition and health diagnosis. The ECU may receive signals such as the steering, slip and vehicle speed as well as signals including the yaw and an ABS or brake signal. These signals may be processed and result in a command signal (Comd.) to the electric actuator 66. The electric actuator 66 may send a signal to the ECU 80 regarding the health or condition of the electric actuator 66. The electric actuator may lock the electric locker 20 and receive a position signal from the electric locker 20.

The invention claimed is:

1. An electric locker differential assembly comprising:
a first and second side gear;
a pinion gear set between the first side gear and the second side gear;
an engagement mechanism configured to have at least a portion of the engagement mechanism moveable from a retracted position to an extended position to lock and unlock the differential assembly;
an electrical adjustment mechanism configured to engage and at least partially control movement of the engagement mechanism,
wherein the adjustment mechanism includes an actuator operably connected an adjustment biasing spring having a first leg retained by the adjustment mechanism and a second leg connected with the engagement mechanism wherein a biasing force of the adjustment biasing spring is varied.

2. The differential assembly of claim 1 wherein the electrical adjustment mechanism includes the actuator operably connected with an adjustment nut and the adjustment biasing spring having the first leg retained by the adjustment nut.

3. The differential assembly of claim 1 wherein the engagement mechanism includes an engagement shaft having a shaft gear formed thereon that engages rim teeth formed on a cam plate.

4. The differential assembly of claim 1 wherein an engagement shaft includes flyweights disposed on the engagement shaft and a flyweight spring connected with the flyweights biasing the flyweights to the retracted position.

5. The differential assembly of claim 1 wherein the engagement mechanism includes a lockout shaft having a pawl disposed about the lockout shaft.

6. The differential assembly of claim 5 wherein the adjustment biasing spring has the first leg retained by an adjustment nut and the second leg connected with the pawl.

7. The differential assembly of claim 6 wherein movement of the adjustment nut alters a position of the first leg wherein a preload applied to the pawl is varied and controlled.

8. The differential assembly of claim 1 wherein the actuator includes a linear electric solenoid coupled to an adjustment nut.

9. The differential assembly of claim 1 wherein the actuator includes a rotary electric solenoid coupled to an adjustment nut.

10. The differential assembly of claim 1 including a selection interface connected to a control unit that sends a signal to the actuator adjusting a position of the actuator and varying a preload on the adjustment biasing spring wherein the locking and unlocking conditions are controlled by control unit.

11. A differential assembly comprising:
a first and second side gear;
a pinion gear set between the first side gear and the second side gear;
an engagement shaft including flyweights disposed on the engagement shaft and moveable between retracted and extended positions to lock and unlock the differential assembly;
a lockout shaft including a pawl disposed thereon;
an adjustment mechanism including an actuator operably connected with an adjustment nut;
an adjustment biasing spring including a first leg retained by the adjustment nut and a second leg connected with the pawl wherein movement of the adjustment nut by the actuator varies a biasing force applied to the pawl.

12. The differential assembly of claim 11 wherein movement of the adjustment nut alters a position of the first leg wherein a preload applied to the pawl is varied.

13. The differential assembly of claim 11 wherein the actuator includes a linear electric solenoid coupled to the adjustment nut.

14. The differential assembly of claim 11 wherein the actuator includes a rotary electric solenoid coupled to the adjustment nut.

15. The differential assembly of claim 11 including a selection interface connected to a control unit that sends a signal to the actuator adjusting a position of the actuator and varying a preload on the adjustment biasing spring.

16. A differential assembly comprising:
a first and second side gear;
a pinion gear set between the first side gear and the second side gear;
an engagement shaft including flyweights disposed on the engagement shaft and moveable between retracted and extended positions to lock and unlock the differential assembly;
a lockout shaft including a pawl disposed thereon;
an adjustment mechanism including an actuator operably connected with an adjustment nut;
an adjustment biasing spring including a first leg retained by the adjustment nut and a second leg connected with the pawl wherein movement of the adjustment nut by the actuator varies a preload applied to the pawl.

17. The differential assembly of claim 16 wherein the actuator includes a linear electric solenoid coupled to the adjustment nut.

18. The differential assembly of claim 16 wherein the actuator includes a rotary electric solenoid coupled to the adjustment nut.

* * * * *